United States Patent
Marc

(10) Patent No.: US 10,618,583 B1
(45) Date of Patent: Apr. 14, 2020

(54) SPLIT SADDLE BICYCLE SEAT ASSEMBLY

(71) Applicant: Michel Marc, Lenexa, KS (US)

(72) Inventor: Michel Marc, Lenexa, KS (US)

(*) Notice: Subject to any disclaimer, the term of this patent is extended or adjusted under 35 U.S.C. 154(b) by 0 days.

(21) Appl. No.: 16/168,901

(22) Filed: Oct. 24, 2018

(51) Int. Cl.
*B62J 1/00* (2006.01)
*B62J 1/02* (2006.01)
*B62J 1/04* (2006.01)
*B62J 1/08* (2006.01)

(52) U.S. Cl.
CPC .............. *B62J 1/08* (2013.01); *B62J 1/005* (2013.01); *B62J 1/007* (2013.01)

(58) Field of Classification Search
CPC ............. B62J 1/005; B62J 1/007; B62J 1/08
USPC ............................................................ 297/201
See application file for complete search history.

(56) References Cited

U.S. PATENT DOCUMENTS

| | | | | |
|---|---|---|---|---|
| 572,062 | A * | 11/1896 | Peck | B62J 1/005 297/201 |
| 603,734 | A * | 5/1898 | Peck et al. | B62J 1/005 297/201 |
| 604,347 | A * | 5/1898 | Bray | B62J 1/005 297/201 |
| 4,089,559 | A * | 5/1978 | Prange | B62J 1/002 297/201 |
| 4,387,925 | A * | 6/1983 | Barker | B62J 1/002 297/201 X |
| 4,451,086 | A * | 5/1984 | Seven | A47C 7/14 297/201 X |
| 4,512,608 | A * | 4/1985 | Erani | B62J 1/005 297/201 X |
| 5,725,274 | A * | 3/1998 | Bergmeister | B62J 1/002 297/201 |
| 5,988,740 | A * | 11/1999 | Caraballo | B62J 1/005 297/201 X |
| 6,056,356 | A * | 5/2000 | Unger, Jr. | B62J 1/002 297/201 X |
| 6,357,825 | B1 | 3/2002 | Bavaresco | |
| 6,402,235 | B1 | 6/2002 | Letendre | |
| 6,761,400 | B2 * | 7/2004 | Hobson | B62J 1/005 297/201 X |
| 6,786,542 | B1 * | 9/2004 | Nuzzarello | B62J 1/005 297/201 X |
| D575,070 | S | 8/2008 | Toll | |
| 7,494,181 | B2 | 2/2009 | Tucker | |
| 9,321,496 | B2 | 4/2016 | Curless | |

(Continued)

FOREIGN PATENT DOCUMENTS

| EP | 467541 A1 * | 1/1992 | ............... B62J 1/08 |
|---|---|---|---|
| GB | 2121740 A * | 1/1984 | ............... B62J 1/002 |

*Primary Examiner* — Rodney B White

(57) ABSTRACT

A split saddle bicycle seat assembly for reducing friction and fatigue in a rider's hip joint while riding a bicycle includes a post that is insertable into a bicycle seat sleeve on a bicycle. A pair of arms is each of the arms is slidably coupled to the plate and each of the arms extends laterally away from the post in opposite directions from each other. A pair of saddles is each pivotally coupled to a respective one of the arms. Thus, each of the saddles can support a respective one of the rider's hip joins when the rider mounts the bicycle. Each of the saddles is pivotal downwardly on the respective arm when the respective rider's hip joint rotates as a consequence of a downward stroke on pedals of the bicycle. In this way each of the saddles reduces friction and fatigue in the rider's hip joints when the bicycle is pedaled.

16 Claims, 5 Drawing Sheets

(56) References Cited

U.S. PATENT DOCUMENTS

| | | | |
|---|---|---|---|
| 9,688,329 B2* | 6/2017 | Pasquier | ................... B62J 1/005 |
| 9,738,341 B2 | 8/2017 | Eldredge | |
| 9,821,867 B2 | 11/2017 | Goff | |
| 10,384,736 B2* | 8/2019 | Pizarro | ...................... B62J 1/04 |
| 2007/0257527 A1* | 11/2007 | Marc | ........................ B62J 1/005 |
| | | | 297/215.1 |
| 2011/0260511 A1 | 10/2011 | Sirjord | |
| 2012/0086246 A1* | 4/2012 | Belliveau | ................... B62J 1/00 |
| | | | 297/201 |
| 2017/0233020 A1* | 8/2017 | Goff | ........................ B62J 1/005 |
| | | | 297/201 |

* cited by examiner

SPLIT SADDLE BICYCLE SEAT ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to split saddle devices and more particularly pertains to a new split saddle device for reducing friction and fatigue in a rider's hip joint while riding a bicycle.

BRIEF SUMMARY OF THE INVENTION

An embodiment of the disclosure meets the needs presented above by generally comprising a post that is insertable into a bicycle seat sleeve on a bicycle. A pair of arms is each of the arms is slidably coupled to the plate and each of the arms extends laterally away from the post in opposite directions from each other. A pair of saddles is each pivotally coupled to a respective one of the arms. Thus, each of the saddles can support a respective one of the rider's hip joins when the rider mounts the bicycle. Each of the saddles is pivotal downwardly on the respective arm when the respective rider's hip joint rotates as a consequence of a downward stroke on pedals of the bicycle. In this way each of the saddles reduces friction and fatigue in the rider's hip joints when the bicycle is pedaled.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
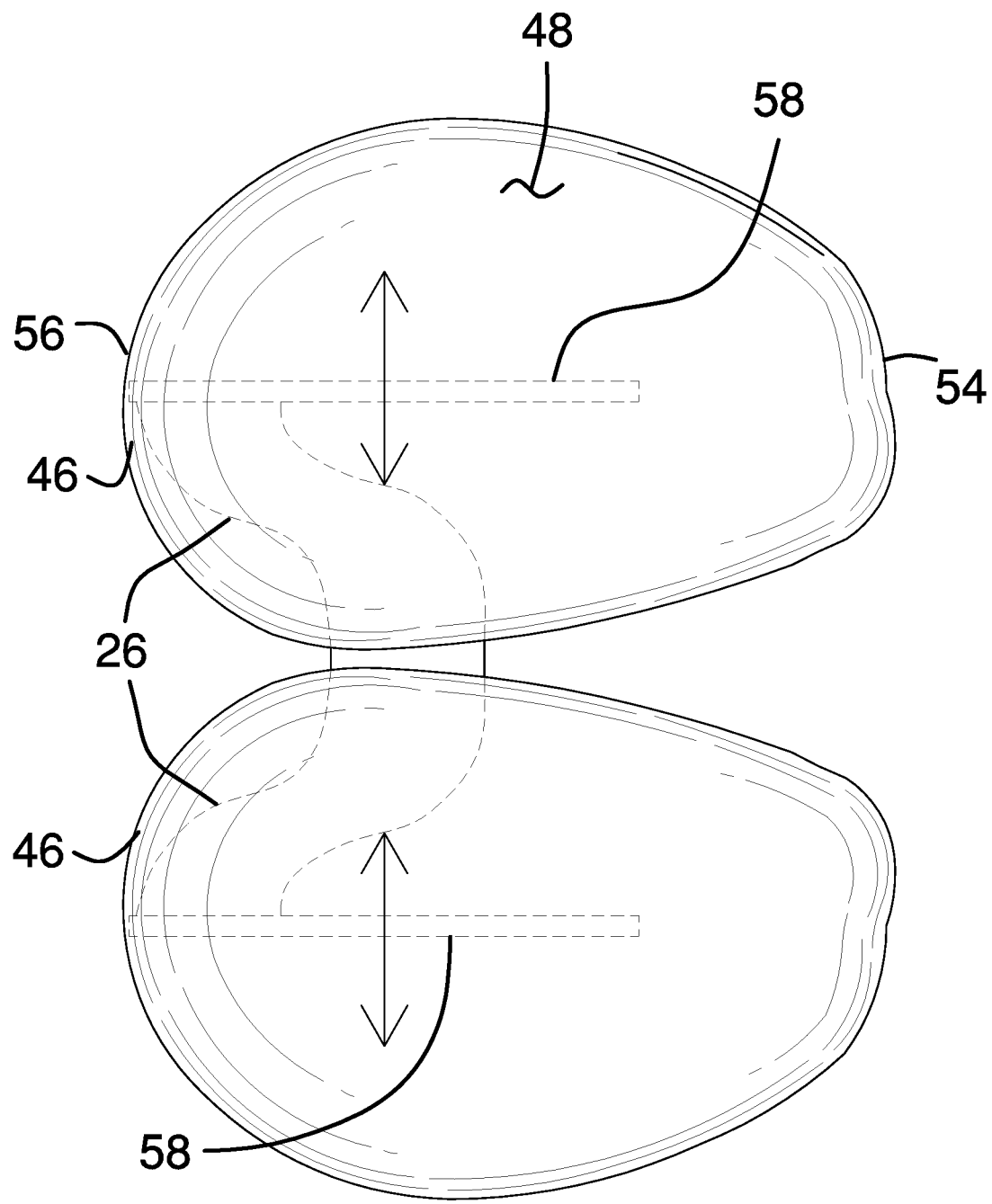
FIG. 1 is a top phantom view of a split saddle bicycle seat assembly according to an embodiment of the disclosure.
Figure 2:
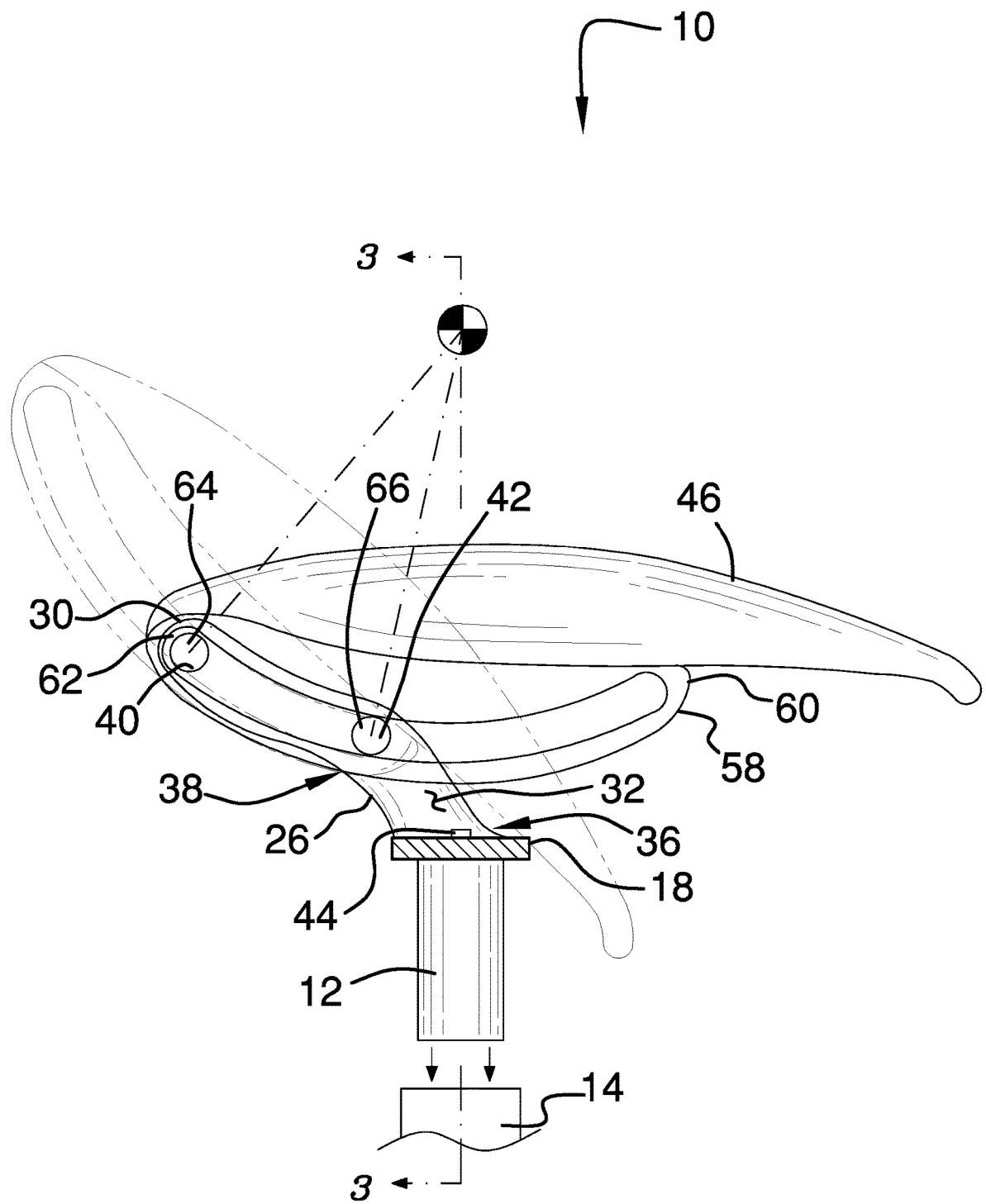
FIG. 2 is a right side view of an embodiment of the disclosure.
Figure 3:
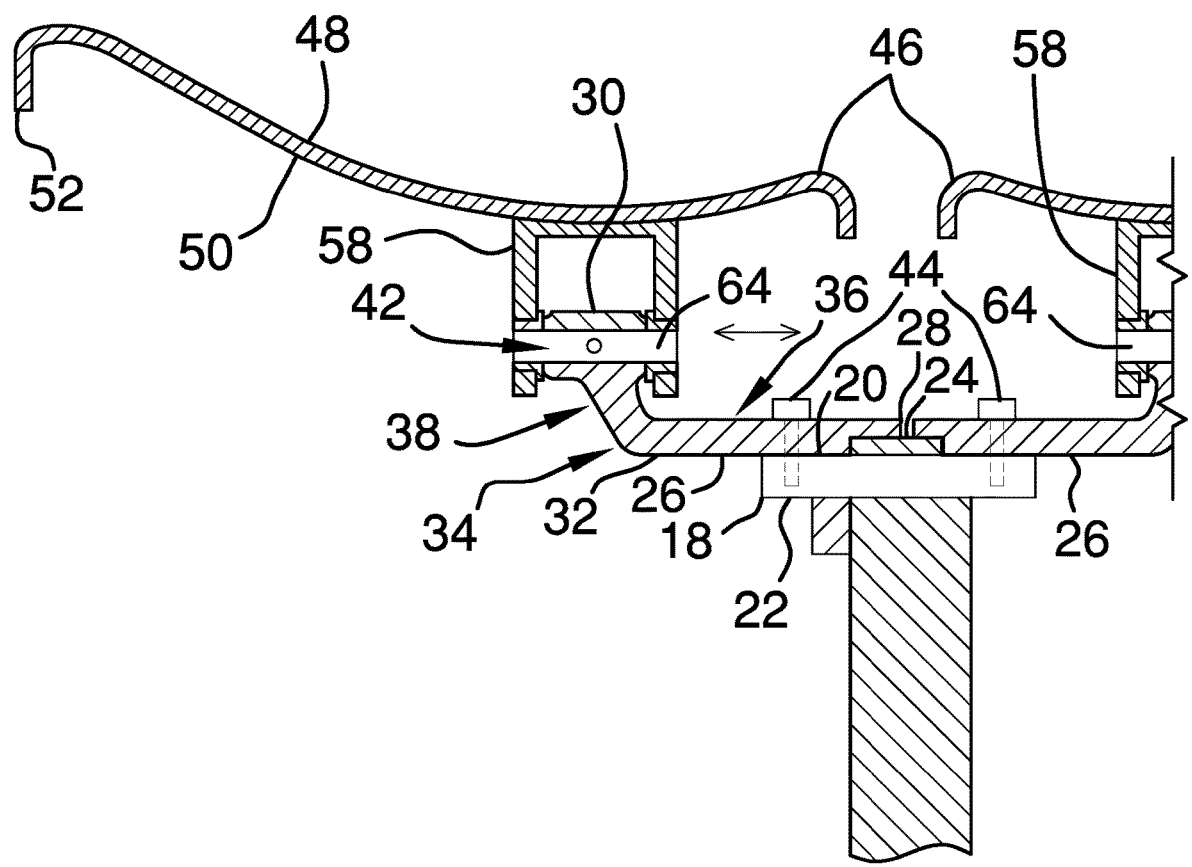
FIG. 3 is a cross sectional view taken along line 3-3 of FIG. 2 of an embodiment of the disclosure.

With reference now to the drawings, and in particular to FIGS. 1 through 5 thereof, a new split saddle device embodying the principles and concepts of an embodiment of the disclosure and generally designated by the reference numeral 10 will be described.

As best illustrated in FIGS. 1 through 5, the split saddle bicycle seat assembly 10 generally comprises a post 12 that is insertable into a bicycle seat sleeve 14 on a bicycle. The post 12 has a top end 16 and the bicycle may be a bicycle of any conventional design. A plate 18 is included that has a top surface 20 and a bottom surface 22, and the bottom surface 22 is coupled to the top end 16 of the post 12. A stop 24 is coupled to and extends upwardly from the top surface 20 of the plate 18, and the stop 24 is centrally positioned on the plate 18.

A pair of arms 26 is each slidably coupled to the plate 18 having each of the arms 26 extending laterally away from the post 12 in opposite directions from each other. Each of the arms 26 has a first end 28, a second end 30 and an outer surface 32 extending therebetween. Moreover, each of the arms 26 has a bend 34 thereon defining a first portion 36 of the arms 26 forming an angle with respect to a second portion 38 of the arms 26. The outer surface 32 of the first portion 36 of each of the arms 26 abuts the top surface 20 of the plate 18 having the second portion 38 of each of the arms 26 being vertically oriented.

The second portion 38 of each of the arms 26 curves upwardly and rearwardly between the bend 34 and the second end 30. Additionally, the first portion 36 of each of the arms 26 extends along the same lateral axis with respect to each other such that the second end 30 of each of the arms 26 is aligned with each other. Each of the arms 26 is slidably adjustable on the plate 18 having the second end 30 of each of the arms 26 being spaceable a selected distance apart from each other. In this way the second end 30 of each of the arms 26 can be aligned with a respective one of the rider's hip joints when the rider is positioned in a seated position on the bicycle.

The second portion 38 of each of the arms 26 has a first pin aperture 40 extending therethrough. The first pin aperture 40 in each of the arms 26 extends along the same lateral axis with respect to each other such that the first pin aperture 40 in each of the arms 26 is aligned with each other. Additionally, the first pin aperture 40 in each of the arms 26 is aligned with the second end 30 of the arms 26. The second portion 38 of each of the arms 26 has a second pin aperture 42 extending therethrough. The second pin aperture 42 in each of the arms 26 extends along the same lateral axis with respect to each other such that the second pin aperture 42 in each of the arms 26 is aligned with each other. Additionally, the second pin aperture 42 in each of the arms 26 is aligned with the bend 34 in the arms 26 such that the first pin aperture 40 in a respective one of the arms 26 is elevated above the second pin aperture 42 in the respective arm 26.

A pair of screws 44 is provided and each of the screws 44 extends through the first portion 36 of a respective one of the arms 26. Each of the screws 44 engages the plate 18 to retain the first end 28 of each of the arms 26 a selected distance apart from each other. The first portion 36 of each of the arms 26 may have an elongated slot extending therethrough and the screws 44 may extend through the elongated slot. Thus, the arms 26 can be slid apart from each other or toward each other for adjusting the distance between said first end 28 of each of the arms 26.

A pair of saddles 46 is provided and each of the saddles 46 is pivotally coupled to a respective one of the arms 26. Thus, each of the saddles 46 supports a respective one of the rider's hip joints when the rider mounts the bicycle. Each of the saddles 46 is pivotal downwardly on the respective arm 26 when the respective rider's hip joint rotates as a consequence of a downward stroke on pedals of the bicycle. In this way each of the saddles 46 reduces friction and fatigue in the rider's hip joints when the bicycle is pedaled. Moreover, each of the saddles 46 pivots into a horizontal orientation when the respective rider's hip joint rotates as a consequence of an upward stroke on the bicycles pedals.

Each of the saddles 46 has an upper surface 48, a lower surface 50 and a perimeter edge 52 extending therebetween. The upper surface 48 of each of the saddles 46 is concavely arcuate with respect to the perimeter edge 52 for enhancing comfort for the rider. The perimeter edge 52 of each of the saddles 46 has a front side 54 and a back side 56. Each of the saddles 46 is elongated between the front 54 and back 56 sides such that each of the saddles 46 has an ovoid shape. Each of the saddles 46 may be downturned along the perimeter edge 52 and each of the saddles 46 may include a cushion thereon for enhancing comfort for the rider.

A pair of tracks 58 is included and each of the tracks 58 is coupled to and extends downwardly from the lower surface 50 of a respective one of the saddles 46. Each of the tracks 58 has a front end 60 and a back end 62. Moreover, each of the tracks 58 is concavely arcuate between the front 60 and back 62 ends such that each of the tracks 58 curves downwardly from the lower surface 50 of the respective saddle 46. Each of the tracks 58 extends substantially from the back side 56 of the perimeter edge 52 of the respective saddle 46 toward the front side 54 of the perimeter edge 52 of the respective saddle 46.

A pair of first pins 64 is included and each of the first pins 64 extends through a respective one of the tracks 58 and extends through the first pin aperture 40 in a respective one of the arms 26. Each of the first pins 64 abuts the back end 62 of the respective track 58 when the respective saddle 46 is in a horizontal orientation. Moreover, each of the first pins 64 travels toward the front end 60 of the respective track 58 when the respective saddle 46 is pivoted downwardly. A pair of second pins 66 is provided and each of the second pins 66 extends through a respective one of the tracks 58 and extends through the second pin aperture 42 in a respective one of the arms 26. Each of the second pins 66 is centrally positioned between the front 60 and back 62 ends of the respective track 58 when the respective saddle 46 is in a horizontal orientation. Additionally, each of the second pins 66 abuts the front end 60 of the respective track 58 when the respective saddle 46 is pivoted downwardly.

Figure 4:
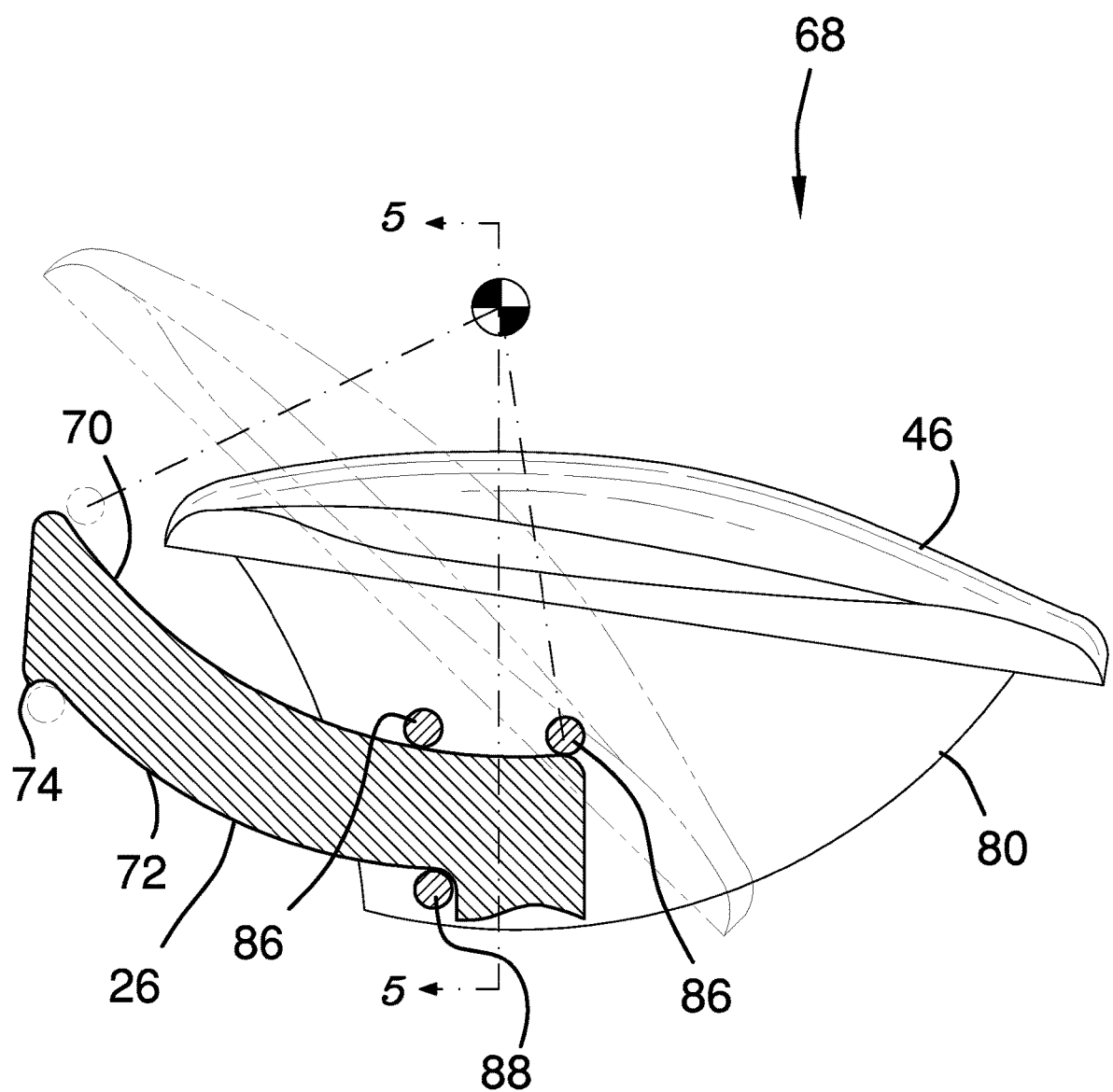
FIG. 4 is a right side view of an alternative embodiment of the disclosure.
Figure 5:
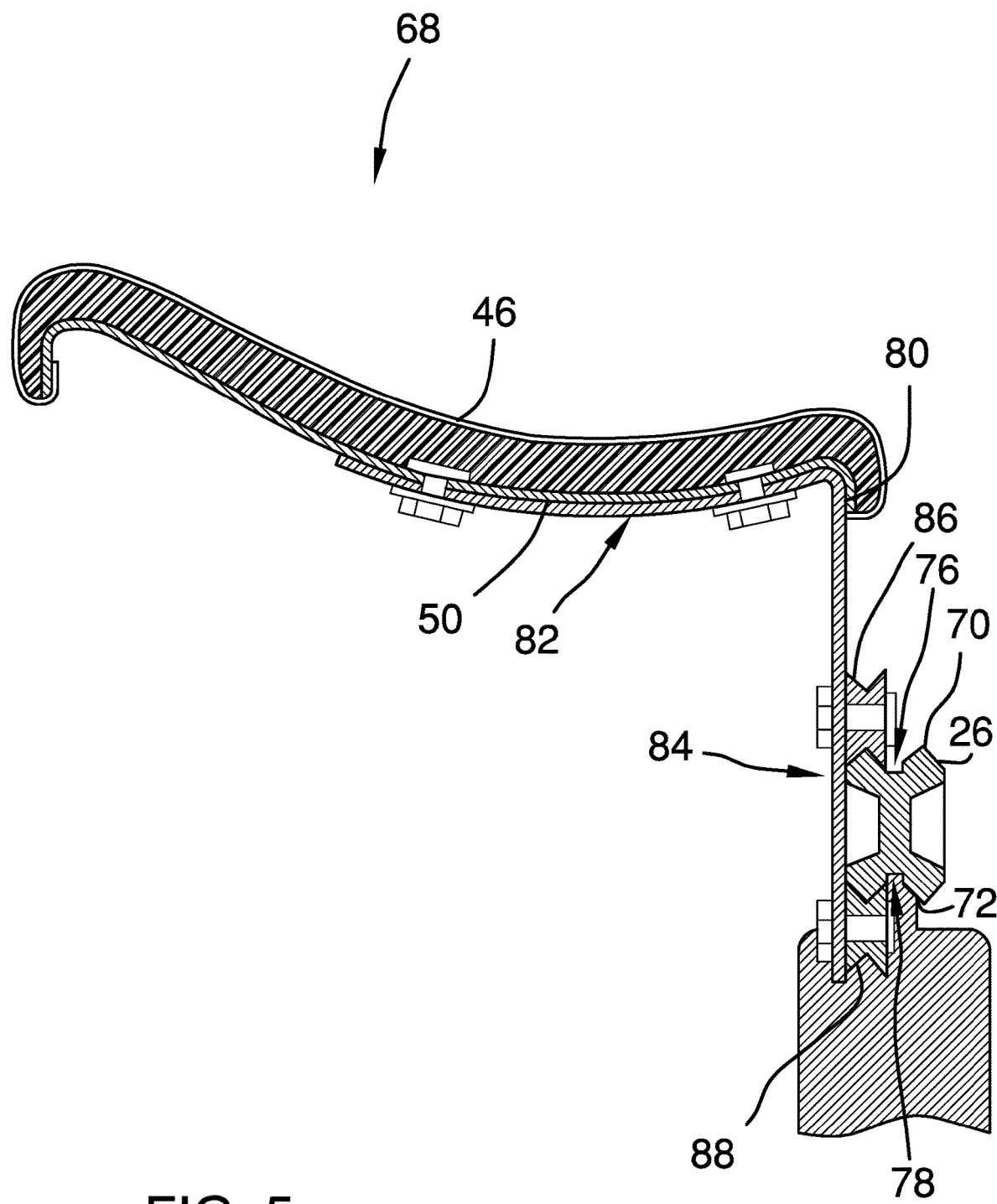
FIG. 5 is a cross sectional view taken along line 5-5 of FIG. 4 of an alternative embodiment of the disclosure.

In an alternative embodiment 68 as shown in FIGS. 4 and 5, the outer surface 32 of each of the arms 26 has a top side 70 and a bottom side 72, and the bottom side 72 of each of the arms 26 has a stop 74 thereon. The stop 74 on a respective one of the arms 26 is aligned with the second end 30 of the respective arm 26. The top side 70 of each of the arms 26 has a first groove 76 extending downwardly toward the bottom side 72 of the arms 26. The first groove 76 in a respective one of the arms 26 extends between the bend 34 and the second end 30 on the respective arm 26. The bottom side 72 of each of the arms 26 has a second groove 78 extending upwardly toward the top side 70 of the arms 26. The second groove 78 in a respective one of the arms 26 extending between the bend 34 and the second end 30 of the respective arm 26.

Continuing in the alternative embodiment 68, a pair of brackets 80 is included and each of the brackets 80 has a primary portion 82 forming an angle with a secondary portion 84. The primary portion 82 of each of the brackets 80 is coupled to the lower surface 50 of a respective one of the saddles 46. Additionally, the secondary portion 84 of each of the brackets 80 extends downwardly from the respective saddle 46.

Continuing in the alternative embodiment 68, a plurality of first rollers 86 is each rotatably coupled to the secondary portion 84 of a respective one of the brackets 80. Each of the first rollers 86 rollably engages the first groove 76 in a respective one of the arms 26. Additionally, each of the first rollers 86 travels between the second end 30 of the respective arm 26 and the bend 34 on the respective arm 26 when the respective saddle 46 pivots downwardly. Continuing in the alternative embodiment 68, a pair of second rollers 88 is each rotatably coupled to the secondary portion 84 of a respective one of the brackets 80. Each of the second rollers 88 rollably engages the second groove 78 in a respective one of the arms 26. Each of the second rollers 88 travels between the stop 24 on the bottom side 72 of the respective arm 26 and the bend 34 on the respective arm 26 when the saddle 46 pivots downwardly.

In use, the post 12 is inserted into the bicycle seat sleeve 14 to attach each of the saddles 46 to the bicycle. Each of the arms 26 is adjusted on the plate 18 to position each of the saddles 46 at a selected width apart from each other. In this way each of the saddles 46 is aligned with the respective rider's hip joint. Additionally, the second end 30 of each of the arms 26 is aligned with the respective rider's hip joint. The screws 44 are tightened to retain the saddles 46 at the selected width and each of the saddles 46 are mounted to ride the bicycle. Each of the saddles 46 alternatively pivots downwardly when the respective rider's hip joint rotates as a consequence of a downward pedal stroke. In this way the rider's hip joints are allowed to rotate freely and to remain in a fixed location with respect to a vertical axis of the post 12 during the downward pedal stroke. Thus, the rider's hip joints are retained in a natural position during downstrokes and upstrokes of pedaling as compared to existing, traditional bicycle seats that force the rider's hip joints to move forwardly and rearwardly on the existing, traditional bicycle seat during downstrokes and upstrokes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A split saddle bicycle seat assembly being configured to pivot with hips of a rider thereby reducing discomfort for the rider, said assembly comprising:
   a post being insertable into a bicycle seat sleeve on a bicycle, said post having a top end;
   a plate having a top surface and a bottom surface, said bottom surface being coupled to said top end of said post;
   a pair of arms, each of said arms being slidably coupled to said plate having each of said arms extending laterally away from said post in opposite directions from each other;
   a pair of saddles, each of said saddles being pivotally coupled to a respective one of said arms wherein each of said saddles is configured to support a respective one of the rider's hip joints when the rider mounts the bicycle, each of said saddles being pivotal downwardly on said respective arm when the respective rider's hip joint rotates as a consequence of a downward stroke on pedals of the bicycle wherein each of said saddles is configured to reduce friction and fatigue in the rider's hip joints when the bicycle is pedaled; and
   a stop being coupled to and extending upwardly from said top surface of said plate, said stop being centrally positioned on said plate.

2. The assembly according to claim 1, wherein each of said arms has a first end, a second end and an outer surface extending therebetween, each of said arms having a bend thereon defining a first portion of said arms forming an angle with respect to a second portion of said arms, said outer surface of said first portion of each of said arms abutting said top surface of said plate having said second portion of each of said arms being vertically oriented, said second portion of each of said arms curving upwardly and rearwardly between said bend and said second end, said first portion of each of said arms extending along the same lateral axis with respect to each other such that said second end of each of said arms is aligned with each other.

3. The assembly according to claim 2, wherein each of said arms is slidably adjustable on said plate having said second end of each of said arms being spaceable a selected distance apart from each other wherein said second end of each of said arms is configured to be aligned with a respective one of the rider's hip joints when the rider is positioned in a seated position.

4. The assembly according to claim 3, wherein said second portion of each of said arms has a first pin aperture extending therethrough, said first pin aperture in each of said arms extending along the same lateral axis with respect to each other such that said first pin aperture in each of said arms is aligned with each other, said first pin aperture in each of said arms being aligned with said second end of said arms.

5. The assembly according to claim 4, wherein said second portion of each of said arms has a second pin aperture extending therethrough, said second pin aperture in each of said arms extending along the same lateral axis with respect to each other such that said second pin aperture in each of said arms is aligned with each other, said second pin aperture in each of said arms being aligned with said bend in said arms such that said first pin aperture in a respective one of said arms is elevated above said second pin aperture in said respective arm.

6. The assembly according to claim 5, wherein each of said saddles has an upper surface, a lower surface and a perimeter edge extending therebetween, said upper surface of each of said saddles being concavely arcuate with respect to said perimeter edge for enhancing comfort for the rider, said perimeter edge of each of said saddles having a front side and a back side, each of said saddles being elongated between said front and back sides such that each of said saddles has an ovoid shape.

7. The assembly according to claim 6, further comprising a pair of tracks, each of said tracks being coupled to and extending downwardly from said lower surface of a respective one of said saddles, each of said tracks having a front end and a back end, each of said tracks being concavely arcuate between said front and back ends such that each of said tracks curves downwardly from said lower surface of said respective saddle.

8. The assembly according to claim 7, further comprising a pair of first pins, each of said first pins extending through a respective one of said tracks and extending through said first pin aperture in a respective one of said arms, each of said first pins abutting said back end of said respective track when said respective saddle is in a horizontal orientation, each of said first pins travelling toward said front end of said respective track when said respective saddle is pivoted downwardly.

9. The assembly according to claim 8, further comprising a pair of second pins, each of said second pins extending through a respective one of said tracks and extending through said second pin aperture in a respective one of said arms, each of said second pins being centrally positioned between said front and back ends of said respective track when said respective saddle is in a horizontal orientation, each of said second pins abutting said front end of said respective track when said respective saddle is pivoted downwardly.

10. The assembly according to claim 3, further comprising a pair of screws, each of said screws extending through said first portion of a respective one of said arms and engaging said plate to retain said first end of each of said arms a selected distance apart from each other.

11. A split saddle bicycle seat assembly being configured to pivot with hips of a rider thereby reducing discomfort for the rider, said assembly comprising:
   a post being insertable into a bicycle seat sleeve on a bicycle, said post having a top end;
   a plate having a top surface and a bottom surface, said bottom surface being coupled to said top end of said post;

a stop being coupled to and extending upwardly from said top surface of said plate, said stop being centrally positioned on said plate;

a pair of arms, each of said arms being slidably coupled to said plate having each of said arms extending laterally away from said post in opposite directions from each other, each of said arms having a first end, a second end and an outer surface extending therebetween, each of said arms having a bend thereon defining a first portion of said arms forming an angle with respect to a second portion of said arms, said outer surface of said first portion of each of said arms abutting said top surface of said plate having said second portion of each of said arms being vertically oriented, said second portion of each of said arms curving upwardly and rearwardly between said bend and said second end, said first portion of each of said arms extending along the same lateral axis with respect to each other such that said second end of each of said arms is aligned with each other, each of said arms being slidably adjustable on said plate having said second end of each of said arms being spaceable a selected distance apart from each other wherein said second end of each of said arms is configured to be aligned with a respective one of the rider's hip joints when the rider is positioned in a seated position, said second portion of each of said arms having a first pin aperture extending therethrough, said first pin aperture in each of said arms extending along the same lateral axis with respect to each other such that said first pin aperture in each of said arms is aligned with each other, said first pin aperture in each of said arms being aligned with said second end of said arms, said second portion of each of said arms having a second pin aperture extending therethrough, said second pin aperture in each of said arms extending along the same lateral axis with respect to each other such that said second pin aperture in each of said arms is aligned with each other, said second pin aperture in each of said arms being aligned with said bend in said arms such that said first pin aperture in a respective one of said arms is elevated above said second pin aperture in said respective arm;

a pair of screws, each of said screws extending through said first portion of a respective one of said arms and engaging said plate to retain said first end of each of said arms a selected distance apart from each other;

a pair of saddles, each of said saddles being pivotally coupled to a respective one of said arms wherein each of said saddles is configured to support a respective one of the rider's hip joints when the rider mounts the bicycle, each of said saddles being pivotal downwardly on said respective arm when the respective rider's hip joint rotates as a consequence of a downward stroke on pedals of the bicycle wherein each of said saddles is configured to reduce friction and fatigue in the rider's hip joints when the bicycle is pedaled, each of said saddles having an upper surface, a lower surface and a perimeter edge extending therebetween, said upper surface of each of said saddles being concavely arcuate with respect to said perimeter edge for enhancing comfort for the rider, said perimeter edge of each of said saddles having a front side and a back side, each of said saddles being elongated between said front and back sides such that each of said saddles has an ovoid shape;

a pair of tracks, each of said tracks being coupled to and extending downwardly from said lower surface of a respective one of said saddles, each of said tracks having a front end and a back end, each of said tracks being concavely arcuate between said front and back ends such that each of said tracks curves downwardly from said lower surface of said respective saddle;

a pair of first pins, each of said first pins extending through a respective one of said tracks and extending through said first pin aperture in a respective one of said arms, each of said first pins abutting said back end of said respective track when said respective saddle is in a horizontal orientation, each of said first pins travelling toward said front end of said respective track when said respective saddle is pivoted downwardly; and a pair of second pins, each of said second pins extending through a respective one of said tracks and extending through said second pin aperture in a respective one of said arms, each of said second pins being centrally positioned between said front and back ends of said respective track when said respective saddle is in a horizontal orientation, each of said second pins abutting said front end of said respective track when said respective saddle is pivoted downwardly.

12. The assembly according to claim 11, wherein said outer surface of each of said arms has a top side and a bottom side, said bottom side of each of said arms having a stop thereon, said stop on a respective one of said arms being aligned with said second end of said respective arm.

13. The assembly according to claim 12, wherein:

said top side of each of said arms has a first groove extending downwardly toward said bottom side of said arms, said first groove in a respective one of said arms extending between said bend and said second end on said respective arm; and said bottom side of each of said arms has a second groove extending upwardly toward said top side of said arms, said second groove in a respective one of said arms extending between said bend and said second end of said respective arm.

14. The assembly according to claim 13, further comprising a pair of brackets, each of said brackets having a primary portion forming an angle with a secondary portion, said primary portion of each of said brackets being coupled to said lower surface of a respective one of said saddles having said secondary portion of each of said brackets extending downwardly from said respective saddle.

15. The assembly according to claim 14, further comprising a plurality of first rollers, each of said first rollers being rotatably coupled to said secondary portion of a respective one of said brackets, each of said first rollers rollably engaging said first groove in a respective one of said arms, each of said first rollers travelling between said second end of said respective arm and said bend on said respective arm when said respective saddle pivots downwardly.

16. The assembly according to claim 15, further comprising a pair of second rollers, each of said second rollers being rotatably coupled to said secondary portion of a respective one of said brackets, each of said second rollers rollably engaging said second groove in a respective one of said arms, each of said second rollers travelling between said stop on said bottom side of said respective arm and said bend on said respective arm when said saddle pivots downwardly.

* * * * *